(12) United States Patent
Kobayasi et al.

(10) Patent No.: US 6,456,623 B1
(45) Date of Patent: Sep. 24, 2002

(54) LINE SWITCHING METHOD AND ASYNCHRONOUS TRANSFER MODE (ATM) SYSTEM USING THE SAME

(75) Inventors: Yasusi Kobayasi; Fumio Hirase, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/173,776

(22) Filed: Oct. 16, 1998

(30) Foreign Application Priority Data

Mar. 18, 1998 (JP) .......................................... 10-068136

(51) Int. Cl.[7] .............................................. H04L 12/56
(52) U.S. Cl. ................................................... 370/395.1
(58) Field of Search .............................. 370/395, 389, 370/397, 399, 351, 352, 462, 525, 537, 401, 400, 362, 418, 442, 447, 450, 461, 248, 249, 250, 251, 252, 241, 244, 241.1, 395.1, 395.2, 395.3, 395.31, 395.32, 395.51; 379/219, 220, 225

(56) References Cited

U.S. PATENT DOCUMENTS 5,963,552 A * 10/1999 Joo et al. .................... 370/395
5,963,555 A * 10/1999 Takase et al. ................ 370/395

FOREIGN PATENT DOCUMENTS

| JP | 60-126997 | 7/1985 |
| JP | 4-49795 | 2/1992 |
| JP | 4-211546 | 8/1992 |

* cited by examiner

*Primary Examiner*—Dang Ton
(74) *Attorney, Agent, or Firm*—Katten Muchin Zavis Rosenman

(57) ABSTRACT

A resource usage of a switching section can be reduced and operations for connection can be facilitated in high speed even if a failure occurs on the switching section by a line switching method. The line switching method in an asynchronous transfer mode exchange including a line concentration and distribution device, to which a subscriber circuit for accommodating a plurality of subscribers, is connected and a switching section, includes the steps of comparing information for identifying a path of a subscriber's cell with information registered in a monitor table, detecting that a first subscriber circuit for accommodating a called subscriber is connected to a same line concentration and distribution device to which a second subscriber circuit for accommodating calling subscriber is connected, and looping back and connecting the call sent from the calling subscriber to the called subscriber without passing through the switching section.

7 Claims, 7 Drawing Sheets

LINE SWITCHING METHOD AND ASYNCHRONOUS TRANSFER MODE (ATM) SYSTEM USING THE SAME

BACKGROUND OF THE INVENTION

1. Field of the Invention

The present invention relates to a line switching method and an asynchronous transfer mode (ATM) exchange using the method.

2. Description of the Related Art

FIG. 6 shows an outline of an asynchronous transfer mode (ATM) exchange. In FIG. 6, subscribers SUB are accommodated respectively in subscriber circuits 1 of the ATM exchange. Additionally, a prescribed number of subscriber circuits 1 are connected to a line concentration and distribution device 2.

The line concentration and distribution device 2 attaches to a cell of call information, a path information tag of an output path and a subscriber circuit, to which the cell is output, and is sent to the switch section 3.

The switch section 3 switches the cell according to the attached path information and connects it to the line concentration and distribution device 2, again. Then, the line concentration and distribution device 2 determines a subscriber circuit 1, to which the called subscriber is connected, according to the path information (tag). After removing the path information of the cell, the cell is connected to the determined subscriber circuit 1.

In other words, a format of the cell input to the line concentration and distribution device 2 is as shown in FIGS. 7A and 7B. As shown in FIGS. 7A, a virtual path identifier (VPI) and a virtual channel identifier (VCI) are included in a header section, and further, the information corresponding to the VPI and VPI is provided in a payload section.

The VPI and VCI distinguish user information and signal information, and send the cell as it is, if it is the signal information, according to the VPI and VCI to a signal processor, not shown in FIGS. 7A and 7B. On the other hand, if it is the user information, switching information A for path setting in a switching section 3 and distribution information B for identifying a subscriber circuit are attached in the cell as a tag to send to the switching section 3.

When a call is generated in this mode, a call processor 4 of the ATM exchange analyzes the cell of the outgoing call. As a result, tags are attached, as shown in FIG. 7B, to specify both of the input and output subscriber circuit 1 and the line concentration and distribution device 2.

In the conventional method, if the same line concentration and distribution device 2 is used for the incoming call and the outgoing call, the switch section 3 sets a path according to the switching information A of the tag for line switching.

In other words, in FIG. 6, when a call from a subscriber accommodated in a subscriber circuit 1 linked to a line concentration and distribution device 2 is addressed to a subscriber connected to a subscriber circuit 1 connected to the same line concentration and distribution device 2, i.e., the destination is the same line concentration and distribution device, the call is passed through the switch section 3 in the exchange, thus making a resource of the switch section be consumed.

SUMMARY OF THE INVENTION

Accordingly, it is an object of the present invention to realize an operational environment where a resource usage of a switching section 3 can be reduced and operations for connection can be facilitated in high speed even if a failure occurs in the switching section 3.

The above-described object is achieved by a line switching method in an asynchronous transfer mode exchange according to the present invention, which includes a line concentration and distribution device, to which a subscriber circuit for accommodating a plurality of subscribers is connected and a switching section, the line switching method comprising the steps of comparing information for identifying a path of a subscriber's cell with information registered in a monitor table, detecting that a first subscriber circuits for accommodating a called subscriber is connected to a same line concentration and distribution device to which a second subscriber circuit for accommodating a calling subscriber is connected, and looping back and connecting the call sent from the calling subscriber to the called subscriber without passing through the switching section.

To carrying out the present invention in one preferred mode, the information registered in the monitor table is controlled by a call processor.

Further, the above-described object is achieved by an asynchronous transfer mode exchange according to the present invention including a line concentration and distribution device, to which a subscriber circuit for accommodating a plurality of subscribers is connected, and a switching section, comprising, a loop back circuit corresponding to the line concentration and distribution device, wherein the loop back circuit loops back and connects a call sent from a calling subscriber to a called subscriber without passing through the switching section when the loop back circuit detects both of subscriber circuits for storing the calling subscriber and called subscriber are connected to a same line concentration and distribution device.

Alternatively, in another mode, the line concentration and distribution device further comprises a monitor table for maintaining subscribers' information stored in the subscriber circuit connected to the line concentration and distribution device and the loop back circuit compares the subscribers' information registered in the monitor table with the information for identifying a path of the subscribers' cell.

Further, in the other mode, the subscribers' information maintained in the monitor table is registered under a control of a call processor.

Furthermore, the loop back circuit including a monitor table is provided on the preceding or latter part of the line concentration device, the information for identifying a path of the subscribers' cell is registered in the monitor table, the information for identifying a path of the calling subscribers' cell is compared with the information for identifying a path of the subscribers' cell registered in the monitor table, and the call sent from the calling subscriber is looped back and connected to the called subscriber without passing through the switching section when the result of the comparison is a coincidence.

Alternatively, in the other mode, an asynchronous transfer mode exchange according to the present invention includes a line concentration and distribution device, to which a subscriber circuit for accommodating a plurality of subscribers is connected, and a switching section, wherein the line concentration and distribution device includes a line concentrator and a distributor, and there are further comprised of a detecting means for detecting both of subscriber circuits for accommodating a calling subscriber and a called subscriber are connected to a same line concentration according to information for identifying a path of a subscribers' cell and a tag attaching circuit for identifying a path of a subscribers' cell provided in the preceding part of the line concentrator, and a multiplexer for multiplexing a cell sent from the switching section with an output from the tag attaching circuit provided in the preceding part of the distributor.

Other objects of the present invention become clear by the description for explaining embodiments according to the attached drawings.

DESCRIPTION OF THE PREFERRED EMBODIMENTS

Figure 1:
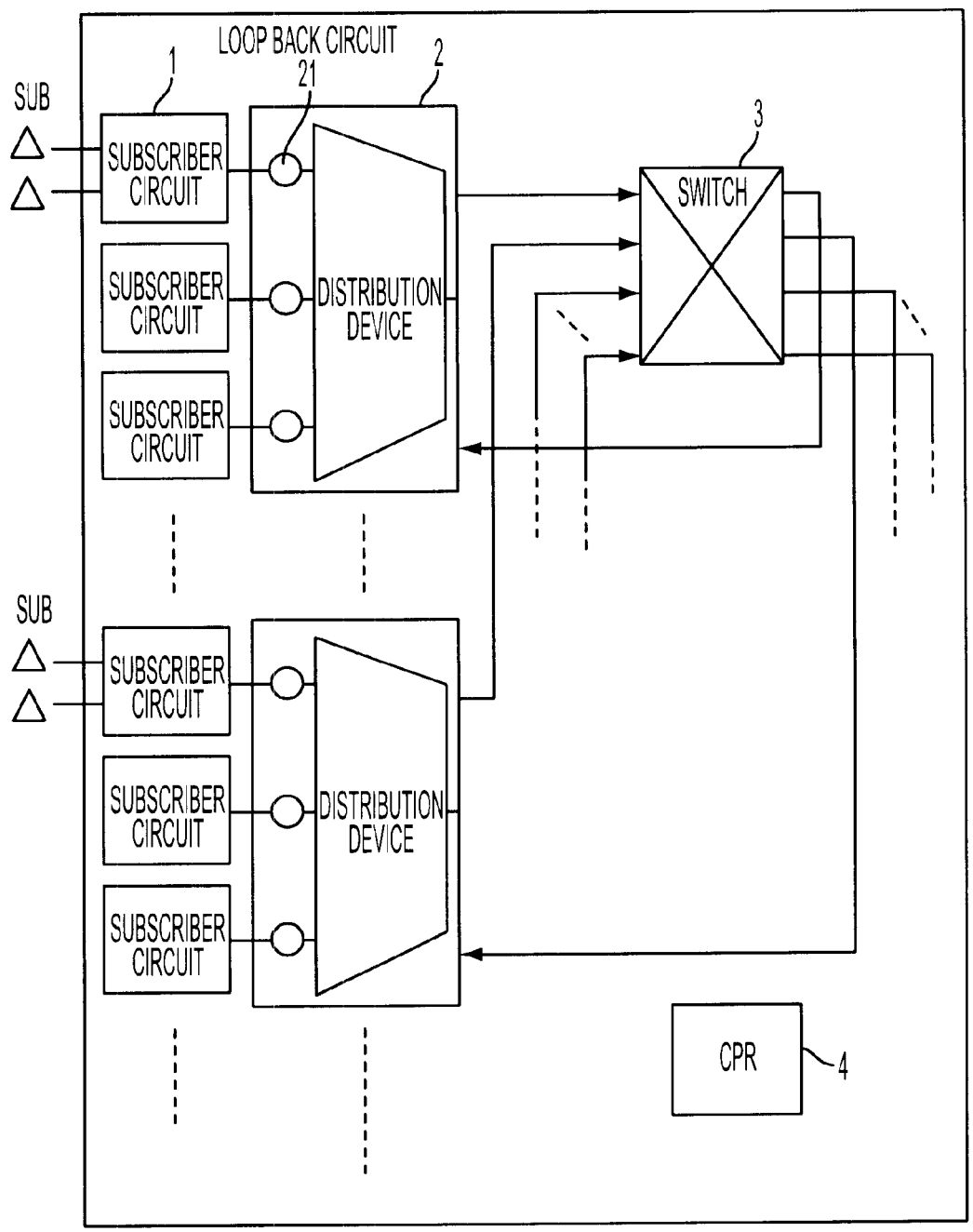
FIG. 1 is a block diagram of a first embodiment according to the present invention.

Embodiments according to the present invention will be now explained in accompanying with the attached drawings. Throughout the following descriptions, the same reference numerals and symbols are used to denote and identify corresponding or identical components.

Figure 6:
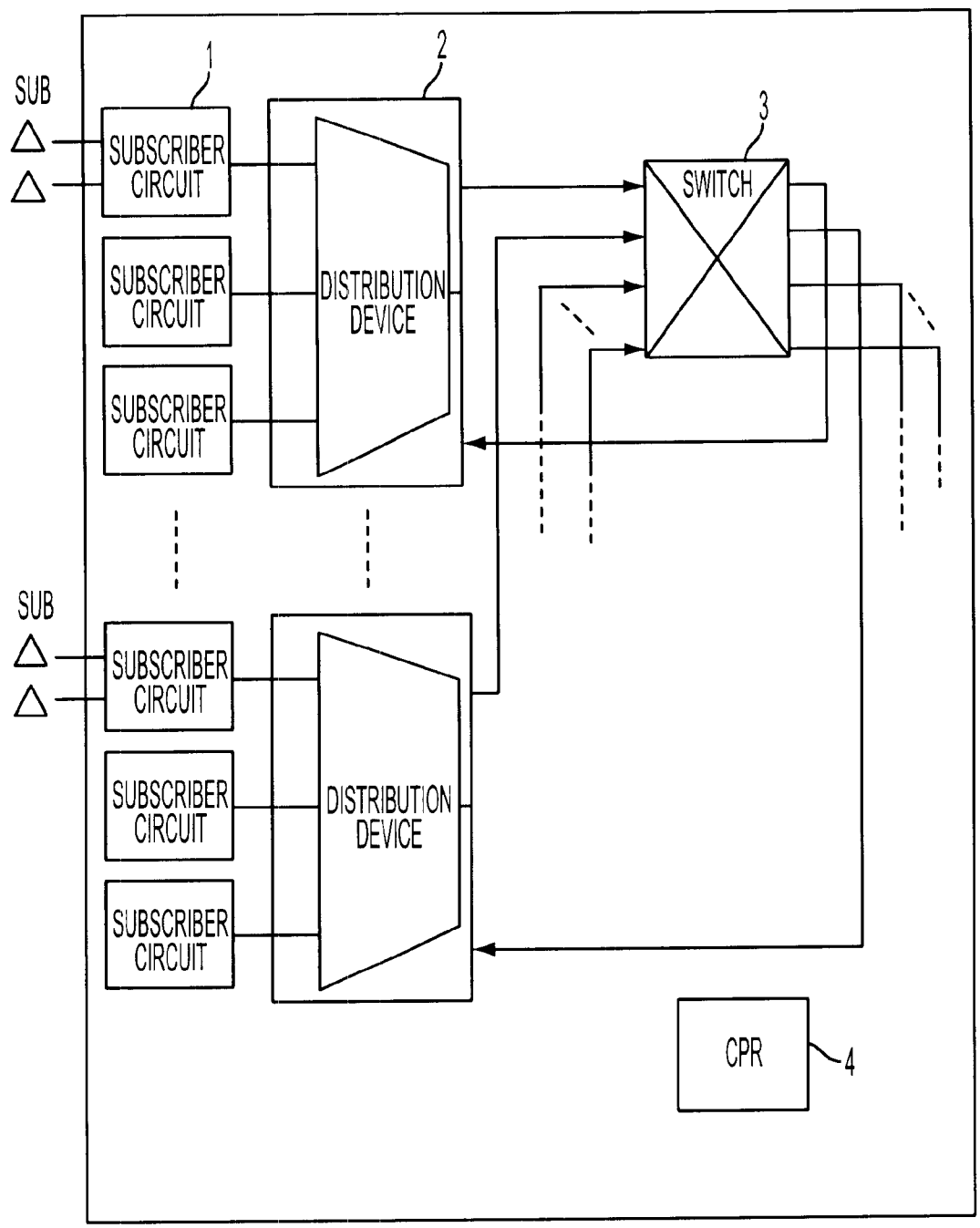
FIG. 6 shows an outline of an asynchronous transfer mode (ATM) exchange.

FIG. 1 is a block diagram of a first embodiment of the present invention. It is a different point from a basic structure shown in FIG. 6 to have a loop back circuit 21.

Figure 7A:
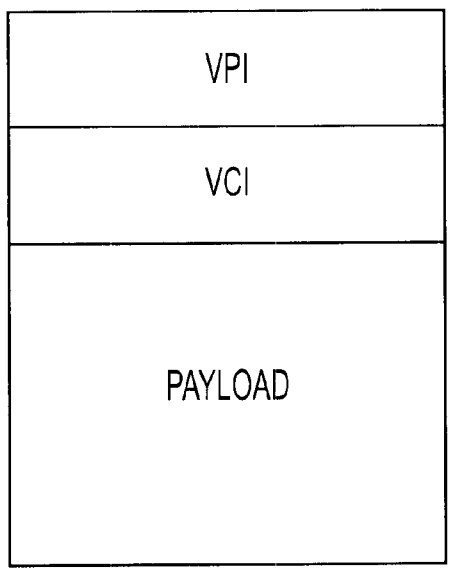
FIGS. 7A and 7B are explanatory diagrams of a format of a cell input to a line concentration and distribution device.

The loop back circuit 21 detects that both subscriber circuits for storing a called subscriber and a calling subscriber are connected to a same line concentration and distribution device 2 according to path identifying information VPI and VCI of a subscriber cell of which format is shown in FIG. 7A.

Additionally, the loop back circuit 21 recognizes a subscriber circuit connected to a same line concentration and distribution device and loops the call back through the recognized subscriber circuit.

Figure 2:
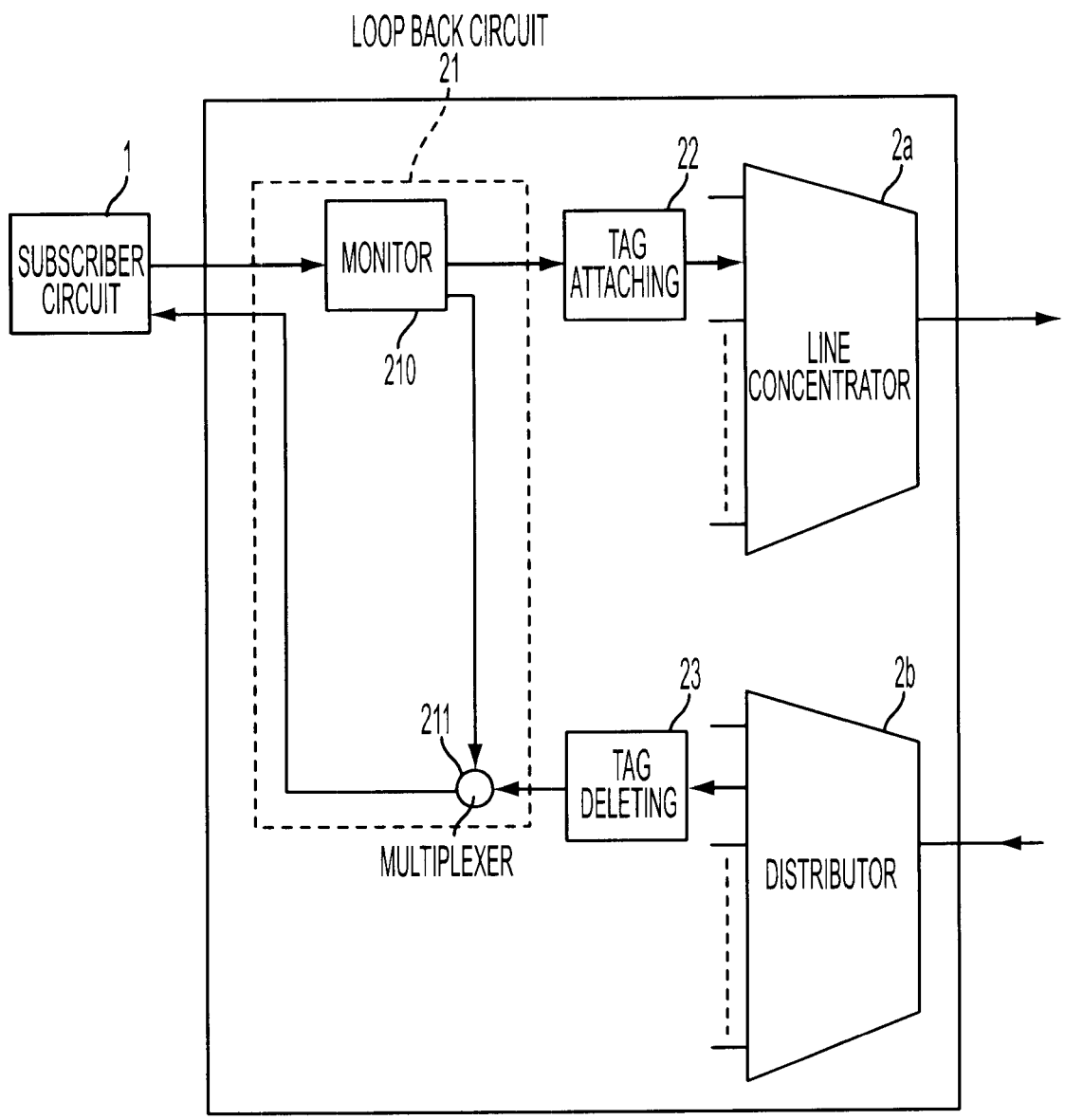
FIG. 2 is a structural diagram of the first embodiment of the present invention, which includes a loop back circuit 21.

FIG. 2 is a structural diagram of the first embodiment according to the present invention, in which the loop back circuit 21 is included. The loop back circuit 21 is provided for one line concentration and distribution device 2. In other words, one line concentration and distribution device 2 includes a line concentrator 2a and distributor 2b.

In the embodiment of FIG. 2, the loop back circuit 21 is provided before the line concentration and distribution device 2. The loop back circuit 21 includes a monitor circuit 210 and a multiplexer 211. An output side of the line concentrator 2a and an input side of the distributor 2b are connected to a switch section 3, not shown in FIG. 2.

Figure 7B:
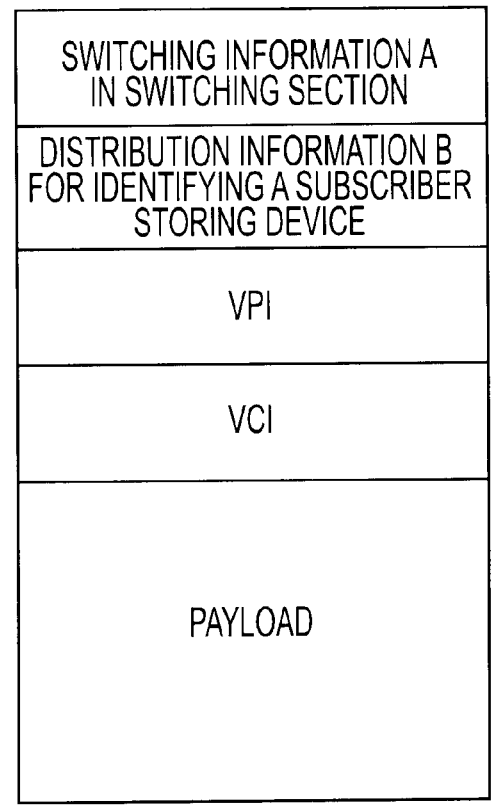

In FIG. 2, a tag attaching circuit 22 provided at the input side of the line concentrator 2a attaches a tag including switching information A for setting an internal path of the switching section 3 and line distribution information B for identifying a subscriber circuit to a cell of which format is shown in FIG. 7A, as shown in FIG. 7B. On the other hand, a tag deleting circuit 23 provided in the output side of the distributor 2b deletes a tag attached to the cell output from the distributor 2b.

In FIG. 2, the monitor 210 of the loop back circuit 21 maintains a monitor table and registers the information for identifying a subscriber circuit sent from the call processor 4 ( refer to FIG. 1). The information for identifying a subscriber circuit is registered as VPI and VCI of the cell of the subscriber accommodated in the subscriber circuit 1, which is connected to the line concentration and distribution device 2.

Accordingly, the monitor 210 compares the VPI and VCI of the inputted cell with those registered in the monitor table. When both VPIs and VCIs are coincident on this comparison, the input cell is not sent to the tag attaching circuit 22, and is multiplexed with a cell sent from the switch section 3 to loop back to a subscriber circuit 1, in which a called subscriber is accommodated.

On the other hand, when the monitor 210 compares the VPI and VCI of the input cell with those registered in the monitor table and detects they are not coincident, the input cell is sent to the tag attaching circuit 22, where a tag is attached to the input cell, as explained in FIGS. 7A and 7B, and is sent to a line concentrator 2a.

Figure 3:
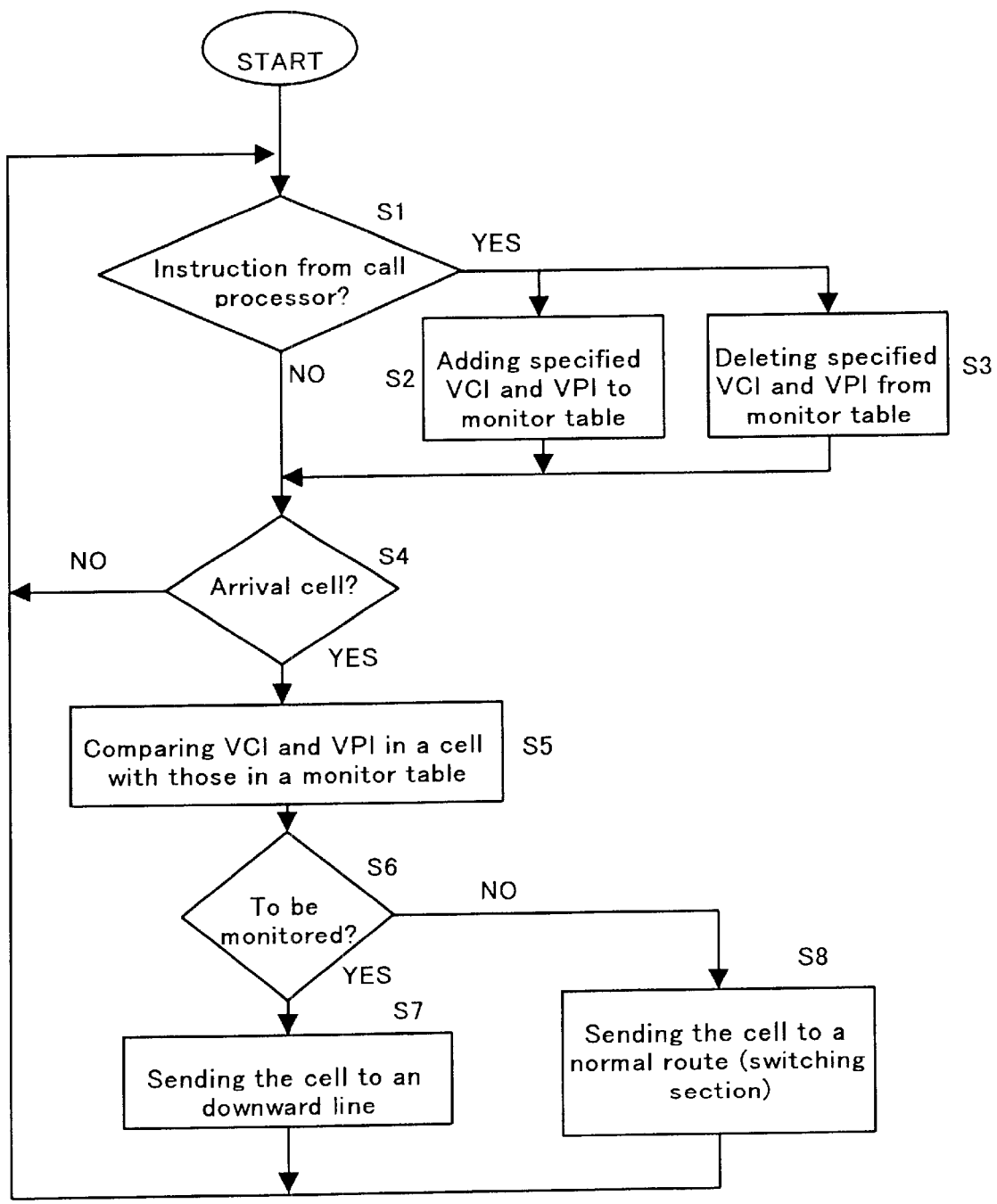
FIG. 3 is a series of operational flowing chart of the first embodiment of FIG. 2.

A series of operations of the embodiment shown in FIG. 2 is shown in an operational flow chart of FIG. 3. In FIG. 3, the line concentration and distribution device 2 judges whether or not an instruction for updating a monitor table is sent from a call processor 4 (STEP S1).

If the instruction for writing to a monitor table is sent from the call processor 4, the device 2 writes the specified VPI and VCI to the monitor table (STEP S2). Further, if the instruction for deleting from the monitor table is sent from the call processor 4, the device 2 deletes the specified VPI and VCI (STEP S3).

In such a situation, the device 2 judges the existence of an arrival cell (STEP S4) and compares VCI and VPI in the arrival cell with those registered in the monitor table (STEP S5).

It is judged whether or not the arrival cell is to be monitored on this comparison (STEP S6). In other words, if both VIPs and VCIs are coincident, the cell is to be monitored. If not, the cell is not to be monitored. Further, if the cell is to be monitored, the device 2 loops the cell back to a downward line (subscriber circuit 1 side) through a multiplexer 211 (STEP S7).

On the other hand, if the cell is not to be monitored, the cell is transmitted to the normal cell route (to a switch section 3) (STEP S8).

Figure 4:
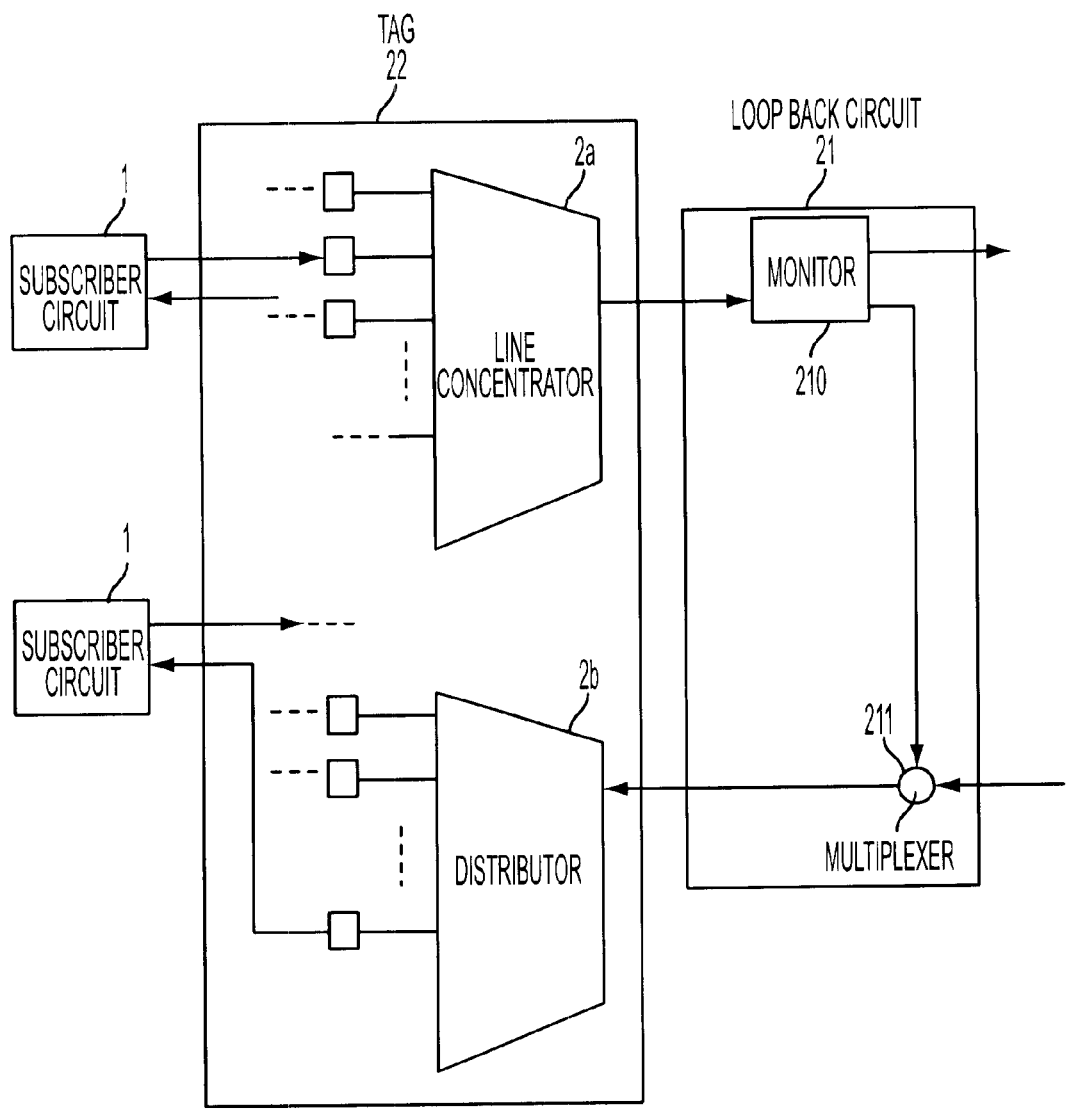
FIG. 4 shows a block diagram of an other embodiment, in which a loop-back 21 is provided in the latter part of a line concentration and distribution device 2, comparing with the embodiment of FIG. 2.

FIG. 4 is another embodiment of the present invention. In this example, a loop back circuit 21 is provided in the latter part of the line concentration and distribution device 2, as compared with the embodiment of FIG. 2. Structures and operations of a monitor circuit 210 and a multiplexer 211 of the loop back circuit 21 are the same as those shown in FIG. 2, except a function of handling a cell to which a tag is attached. Therefore, further explanation will be omitted here.

Figure 5:
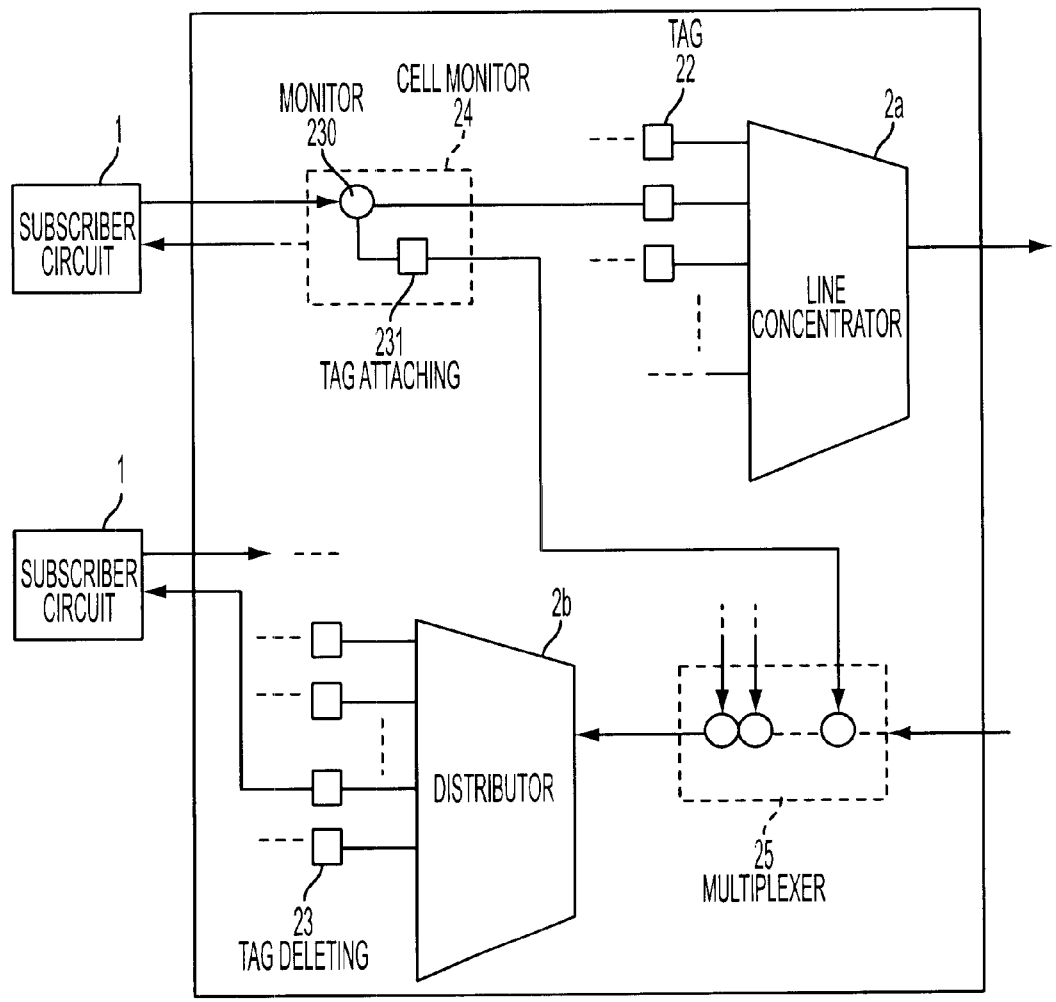
FIG. 5 shows an embodiment, in which a loop back function is provided in the inside of the line concentration and distribution device 2.

FIG. 5 shows a still other embodiment of the present invention. In the embodiments of FIGS. 2 and 3, a loop back circuit 21 is provided in the external of a line concentration and distribution device 2. Further, the circuit 21 is connected to the preceding or latter part of the line concentration and distribution device 2. In this embodiment of FIG. 5, a look back circuit 21 is provided in the inside of the line concentration and distribution device 2.

In FIG. 5, a cell monitor section 24 includes a monitor 230 and a tag attaching circuit 231. The monitor 230 includes an administration table, similarly to the above-described embodiments. The monitor 230 compares VCI and VPI of a cell to be inputted with those registered in the administration table.

If both VCIs and VIPs are not coincident as the result of the comparison, the tag attaching circuit 22 connected to the concentrator 2a attaches both of switching information A in the switching section 3 and distribution information B for identifying a subscriber circuit, as shown in FIG. 7B. Thereby, the input cell can pass through a normal route, i.e. the switching section 3.

On the other hand, if both VCIs and VIPs are coincident as the compared result, the tag attaching circuit 231 adds only the distribution information B for identifying a subscriber circuit to input to the multiplexer 25. Additionally, the cell sent from the switching section 3 and cells output from the tag attaching circuit 231 of the cell monitor section 23 corresponding to the other subscriber lines connected to the same line concentration and distribution device 2 are input.

The output from the multiplexer 25 is input to the distributor 2b and is sent to a subscriber line corresponding to the distribution information B. Then, the tag of the line distribution information B is deleted by the tag deleting circuit 23 before the information B is input to the subscriber line.

As explained in accompanying to the attached drawings, the present invention realizes to send a call cell, which is passed through both of input and output sides of a line concentration and distribution device 2, without routing a switching section 3 to a called subscriber.

Accordingly, operations can be facilitated without consuming a resource of a switching section 3. Therefore, even if a failure occurs on the switching section 3, it is possible to decrease a loss caused by the failure or the shortage of the capacity in the switch and prevent from lowering a quality of the service.

The present invention may be embodied in other specific forms without departing from the sprit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A line switching method in an asynchronous transfer mode exchange which includes a line concentration and distribution device, to which a subscriber circuit for accommodating a plurality of subscribers, is connected and a switching section, the line switching method comprising the steps of:

comparing information for identifying a path of a subscriber's cell with information registered in a monitor table;

detecting that a first subscriber circuit for accommodating a called subscriber is connected to a same line concentration and distribution device to which a second subscriber circuit for accommodating a calling subscriber is connected; and looping back and connecting the call sent from the calling subscriber to the called subscriber without passing through the switching section.

2. The method according to claim 1, wherein the information registered in the monitor table is controlled by a call processor.

3. An asynchronous transfer mode exchange including a line concentration and distribution device, to which a subscriber circuit accommodating a plurality of subscribers is connected, and a switching section, comprising:

a loop back circuit corresponding to the line concentration and distribution device, wherein the loop back circuit loops back and connects a call sent from a calling subscriber to a called subscriber without passing through the switching section when the loop back circuit detects both of subscriber circuits for accommodating the calling subscriber and called subscriber are connected to a same line concentration and distribution device.

4. The exchange according to claim 3, wherein the line concentration and distribution device further comprises a monitor table for maintaining subscribers' information stored in the subscriber circuit connected to the line concentration and distribution device and the loop back circuit compares the subscribers' information registered in the monitor table with the information for identifying a path of the subscribers' cell.

5. The exchange according to claim 4, wherein the subscribers' information maintained in the monitor table is registered under a control of a call processor.

6. The exchange according to claim 3, wherein the loop back circuit including a monitor table is provided on the preceding or latter part of the line concentration device, the information for identifying a path of the subscribers' cell is registered in the monitor table, the information for identifying a path of the calling subscribers' cell is compared with the information for identifying a path of the subscribers' cell registered in the monitor table, and the call sent from the calling subscriber is looped back and connected to the called subscriber without passing through the switching section when the result of the comparison is a coincidence.

7. An asynchronous transfer mode exchange including a line concentration and distribution device, to which a subscriber circuit for accommodating a plurality of subscribers is connected, and a switching section, wherein the line concentration and distribution device includes a line concentrator and a distributor, there are further comprised of; a detecting means for detecting both of subscriber circuits for accommodating a calling subscriber and a called subscriber are connected to a same line concentration according to information for identifying a path of a subscribers' cell and a tag attaching circuit for identifying a path of the subscribers' cell provided in the preceding part of the line concentrator, and a multiplexer for multiplexing a cell sent from the switching section with an output from the tag attaching circuit provided in the preceding part of the distributor.

* * * * *